(12) United States Patent
Mutha et al.

(10) Patent No.: US 11,964,454 B2
(45) Date of Patent: Apr. 23, 2024

(54) TUBE COMPRISING A TUBE HEAD AND A TUBE SKIRT MADE OF A LAMINATED MATERIAL COMPRISING A PLURALITY OF PAPER LAYERS

(71) Applicant: ALBEA SERVICES, Gennevilliers (FR)

(72) Inventors: Nitin Mutha, Gennevilliers (FR); Gilles Swyngedauw, Gennevilliers (FR); Sanket Pandya, Gennevilliers (FR)

(73) Assignee: ALBEA SERVICES, Gennevilliers (FR)

( * ) Notice: Subject to any disclaimer, the term of this patent is extended or adjusted under 35 U.S.C. 154(b) by 132 days.

(21) Appl. No.: 17/760,623

(22) PCT Filed: Sep. 16, 2020

(86) PCT No.: PCT/EP2020/075915
§ 371 (c)(1),
(2) Date: Mar. 15, 2022

(87) PCT Pub. No.: WO2021/053043
PCT Pub. Date: Mar. 25, 2021

(65) Prior Publication Data
US 2022/0332098 A1    Oct. 20, 2022
US 2023/0391058 A2    Dec. 7, 2023

(30) Foreign Application Priority Data

Sep. 16, 2019 (EP) .................... 19306112

(51) Int. Cl.
B32B 27/10    (2006.01)
B32B 1/00    (2006.01)
(Continued)

(52) U.S. Cl.
CPC .............. *B32B 27/10* (2013.01); *B32B 1/00* (2013.01); *B32B 7/12* (2013.01); *B32B 15/082* (2013.01); *B32B 15/20* (2013.01); *B32B 27/08* (2013.01); *B32B 27/32* (2013.01); *B65D 35/10* (2013.01); *B65D 65/40* (2013.01);
(Continued)

(58) Field of Classification Search
CPC .. B32B 27/10; B32B 1/00; B32B 7/12; B32B 15/082; B32B 15/20; B32B 27/08; B32B 27/32; B32B 2250/05; B32B 2307/718; B32B 2439/40
See application file for complete search history.

(56) References Cited

U.S. PATENT DOCUMENTS

2016/0272389 A1    9/2016    Wang

FOREIGN PATENT DOCUMENTS

CN    102470642 A    5/2012
CN    104968496 B    6/2017
(Continued)

OTHER PUBLICATIONS

Application No. PCT/EP2020/075915, International Search Report and Written Opinion of the International Search Authority, dated Dec. 4, 2020, 11 pages.
(Continued)

*Primary Examiner* — Michael C Miggins
(74) *Attorney, Agent, or Firm* — Kilpatrick Townsend & Stockton LLP

(57) ABSTRACT

A laminated material for forming a flexible container, said laminated material comprising one or several polymeric layers and at least two paper layers.

13 Claims, 8 Drawing Sheets

(51) Int. Cl.
    *B32B 7/12*        (2006.01)
    *B32B 15/082*    (2006.01)
    *B32B 15/20*     (2006.01)
    *B32B 27/08*     (2006.01)
    *B32B 27/32*     (2006.01)
    *B65D 35/10*     (2006.01)
    *B65D 65/40*     (2006.01)

(52) U.S. Cl.
    CPC ..... *B32B 2250/05* (2013.01); *B32B 2307/718* (2013.01); *B32B 2439/40* (2013.01)

(56) References Cited

FOREIGN PATENT DOCUMENTS

| | | |
|---|---|---|
| JP | 2006021816 A | 1/2006 |
| JP | 2016066519 A | 4/2016 |
| WO | 03033370 A1 | 4/2003 |
| WO | 2011003564 A1 | 1/2011 |
| WO | 2017089507 A1 | 6/2017 |

OTHER PUBLICATIONS

Application No. IN 202217012782, Examination Report, dated Aug. 25, 2022, 7 pages.
Application No. PCT/EP2020/075915, International Preliminary Report on Patentability, dated Mar. 15, 2022, 9 pages.
CN2020800651580, "First Office Action", dated May 26, 2023, 15 Pages.

[Fig.1]
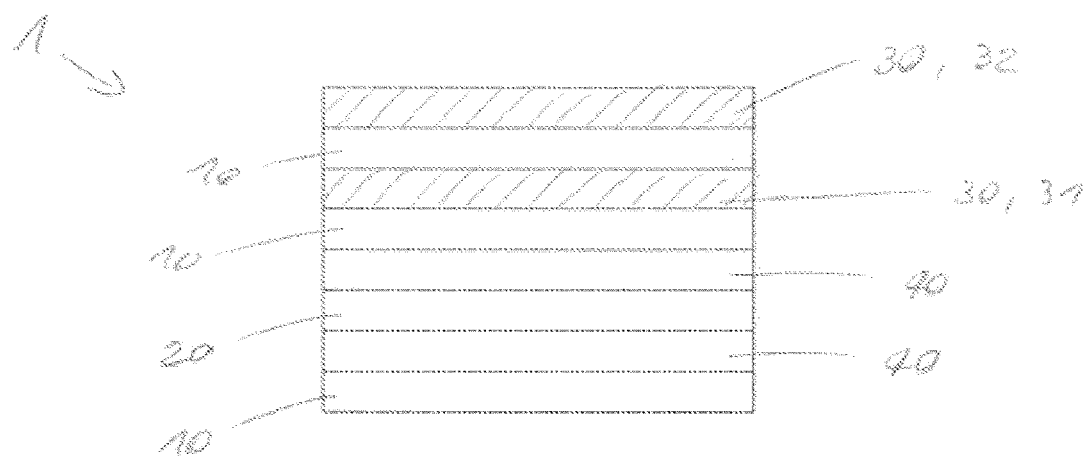

[Fig.2]
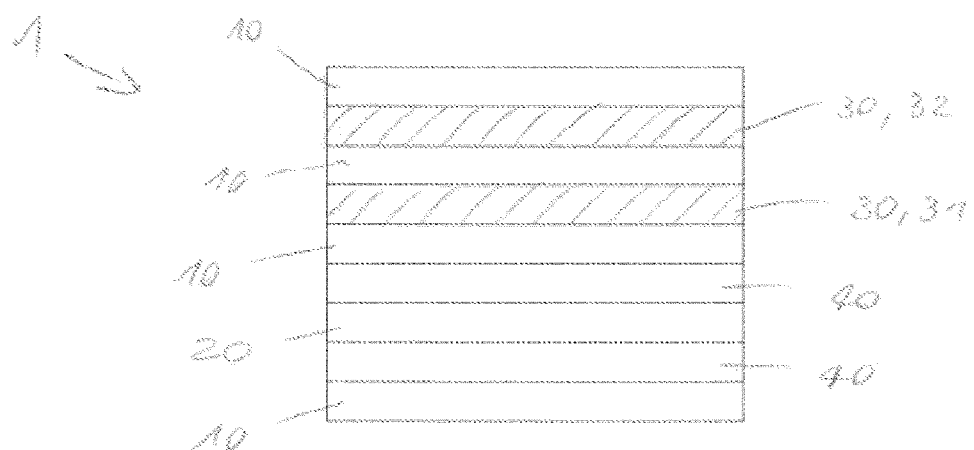

[Fig.3]
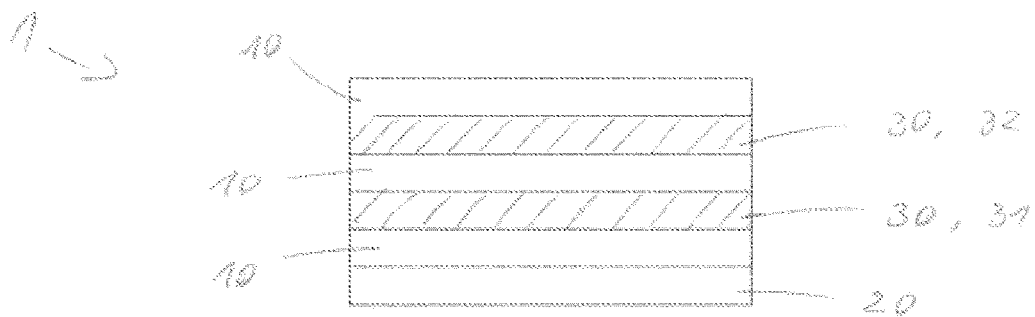

[Fig.4]
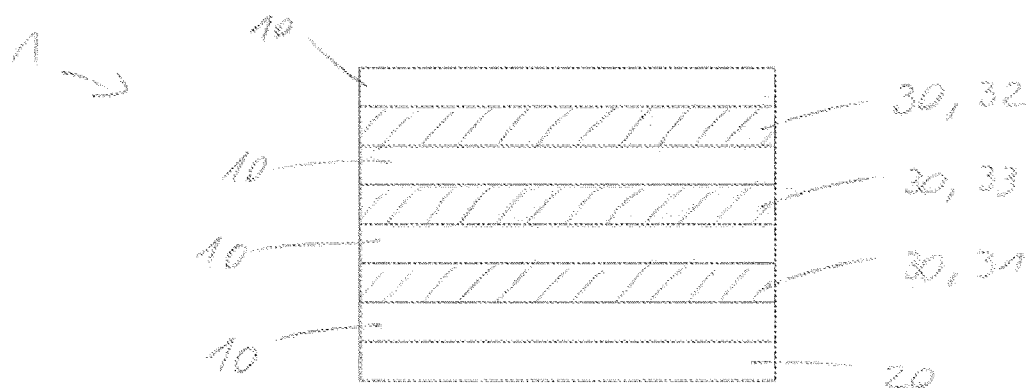

[Fig.5]
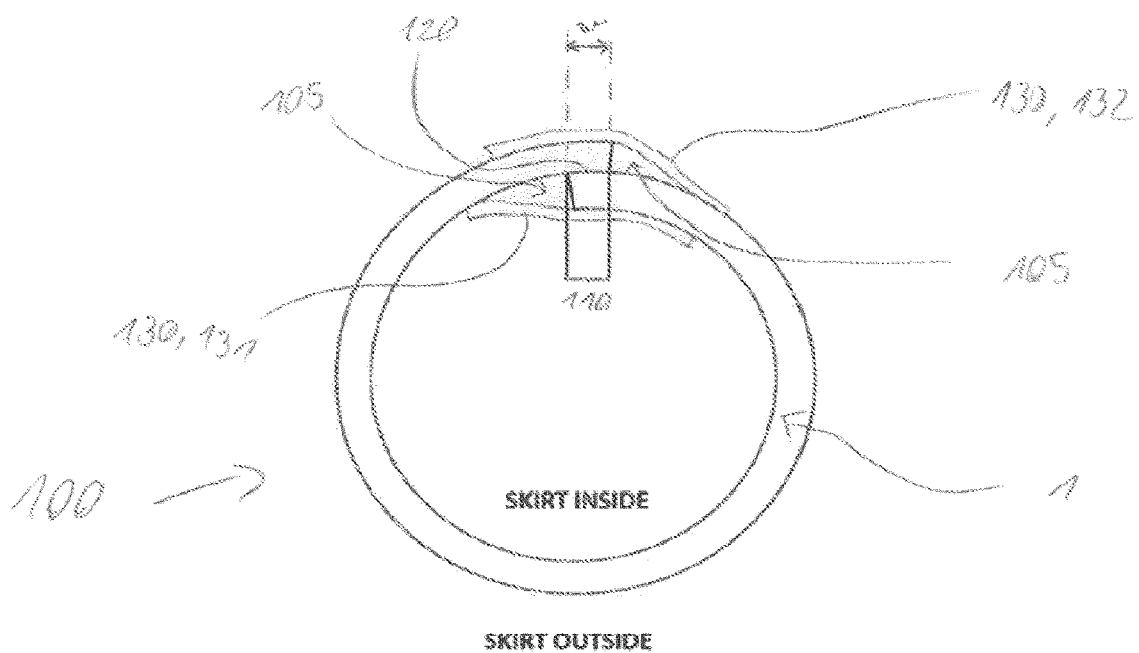

[Fig.6]
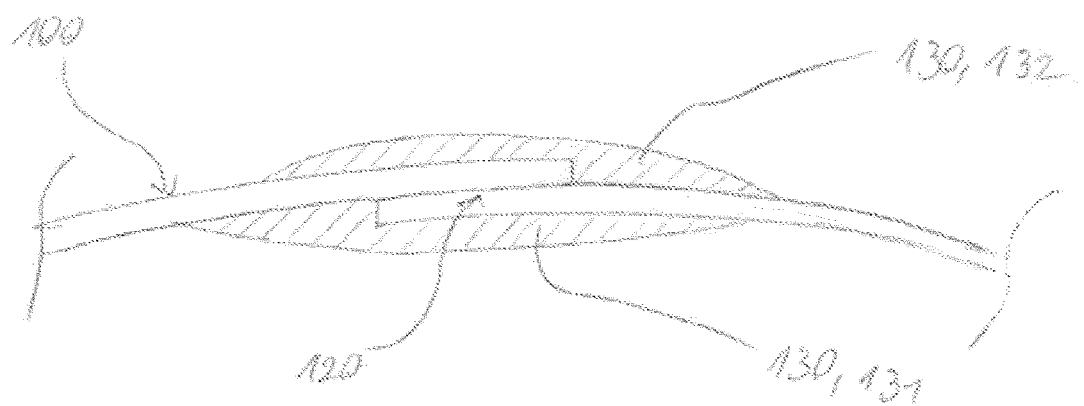

[Fig.7]
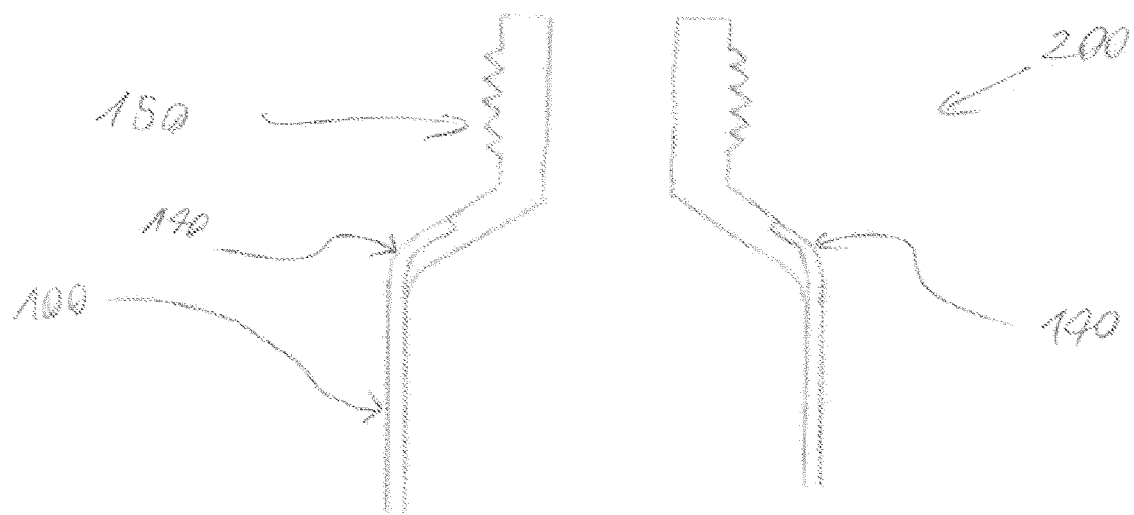

[Fig.8]
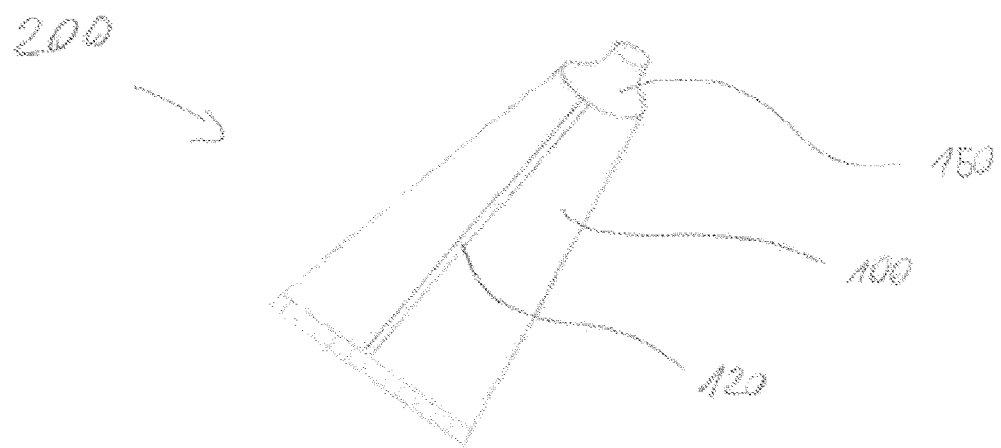

TUBE COMPRISING A TUBE HEAD AND A TUBE SKIRT MADE OF A LAMINATED MATERIAL COMPRISING A PLURALITY OF PAPER LAYERS

The invention relates to a laminated material for forming a container. The invention also relates to a flexible tube skirt comprising said laminated material.

Nowadays, the worldwide plastic production represents one of the biggest waste sources. The consumption and the recycling of these plastic products is a major concern for national and regional organizations. The non-recycled plastic materials are currently disposed of by a variety of processes from landfill disposal to energy recovery through thermal and chemical treatments.

In the case of cosmetic packaging industry, laminated materials comprising several plastic layers are widely used as they represent advantages in terms of product protection and mechanical properties.

Some alternatives to plastics are studied in many technical fields. In the field of cosmetics packaging, it has already been envisaged to replace some plastic layers with a paper layer. As the paper is easily recyclable, the presence of a paper layer improves the recyclability of the laminated material. The thicker the paper layer, the higher the proportion of paper in the laminate and the more recyclable the laminate. However, the presence of a paper layer in the laminate has certain drawback.

A first drawback of the use of paper lies in the fact that the paper layer promotes delamination. In case of a laminate material used to form a tube skirt, this delamination is especially promoted in the region of the junction between a tube head and the skirt.

A conventional technique for forming a tube skirt is to overlap the edges of a laminate sheet and compress this overlapping region to form a longitudinal side seam. A second drawback of the presence of a paper layer in the laminate material is that, when forming the side seam, it is not possible to compress and heat as much as with plastic laminate since the paper has a lower compression ratio than usual plastic layers.

The present invention attempts to solve at least one of the above mentioned problems and propose a laminated material for forming a flexible container, said laminated material comprising one or several polymeric layers and at least two paper layers.

In such laminated material, the applicant discovered that for the same amount of paper in mass in the laminated material, multiplying the number of layers of paper helps to limit the delamination of the laminated material. Therefore, It is possible to increase the paper quantity in the laminated material and thus improving the recyclability of the material without causing delamination.

The invention can also comprise any of the following features taken individually or in any technically possible combination:
- the laminated material comprises at least two polymeric layers and at least one barrier layer,
- the paper layers are separated by at least one polymeric layer,
- at least one of the paper layers is sandwiched by polymeric layers,
- all the paper layers are sandwiched by polymeric layers,
- a proportion in mass of said layer is chosen so that said laminated material is recyclable,
- the paper layers represents at least 60% in mass of the laminated material,
- the paper layers represents at least 70% in mass of the laminated material,
- each of the paper layer has a thickness comprised between 100 and 200 μm,
- the total thickness of the paper layers is comprised between 200 μm and 400 μm,
- the total thickness of the paper layers represent more than 50% of the total thickness of the laminated material,
- the total thickness of the paper layers represent more than 70% of the total thickness of the laminated material,
- the thickness of the laminated material is comprised between 300 and 450 μm,
- the paper layers have different thickness,
- the laminated material comprises an inner paper layer and an outer paper layer,
- the outer paper layer is thicker than the inner paper layer,
- a grammage of the inner paper layer is inferior to a grammage of the outer paper layer,
- the laminated material comprises an intermediate paper layer located between the inner paper layer and the outer paper layer,
- the paper layers have the same thickness,
- the polymeric layers comprise PE,
- the barrier layer comprises aluminum,
- the barrier layer comprises EVOH.

The invention also relates to a tube skirt made of the laminated material as described above, said tube skirt comprising an overlap side seam and at least a sealing strip at the level of the overlapping region.

The invention can also comprise any of the following features taken individually or in any technically possible combination:
- the tube skirt comprises a first sealing strip covering the overlap side seam at the interior side of the tube skirt
- the tube skirt comprises a second sealing strip covering the overlap side seam at the exterior side of the tube skirt,
- the overlap side seam has a width (w) of at most 0.5 mm,
- the sealing strip has a width comprised between 3 and 5 mm,
- the sealing strips comprise PE and EVOH.

The invention also relates to a tube comprising the tube skirt as described above, in which the paper represents at least 50% in mass of the tube.

The invention will be better understood thanks to the following description which is only indicative and which is not intended to limit said invention, accompanied with the following figures:

FIG. 1 is a schematic diagram of the layers that form the laminate according to an embodiment of the present invention, FIG. 2 is a schematic diagram of the layers that form the laminate according to a second embodiment of the present invention, FIG. 3 is a schematic diagram of the layers that form the laminate according to a third embodiment of the present invention, FIG. 4 is a schematic diagram of the layers that form the laminate according to a fourth embodiment of the present invention, FIG. 5 is a cross-sectional view of a tube skirt according to the present invention, before tube formation FIG. 6 is a zoom on an overlapping region of the tube skirt of FIG. 5, after tube formation FIG. 7 is a partial sectional view of a tube according to the invention, FIG. 8 is an illustration of a tube according to the invention.

In the context of the invention, the following definitions and abbreviations are used. As used herein, the terms "outer", "inner", "upper" and "lower", and the like, used with respect to the various layers refer to the laminated material with the intended outer or upper surface uppermost and the intended inner or lower (product-contacting) surface lowermost. In addition, these terms and the terms "over", "under" or "on" do not imply that the layers are necessarily directly in contact.

The term "container" is used herein to refer to an item which may contain a product. Such products are usually liquids, gels or pastes. Preferred containers include tubes and pouches. The container may further comprise a lid or a cap and, if necessary, attachment means for the lid or cap (such as a tube head or shoulder) before it forms a useful commercial container. As a consequence, the laminated material of the invention can form a tube skirt, an insert of a tube head or a combination thereof.

The term "flexible laminate" as used herein describes a laminate or a container made thereof which can bend or be bent easily and which does not break (unless it is bent too much). Herein in connection with the containers the term flexible indicates that if the container is subjected to a force, for example, by being filled with a liquid, or by applying pressure with a finger or a hand, it will change its form without breaking. A flexible container can also be considered to be a "squeezable" container.

The term "adhesive layer" refers to a layer which is placed between two layers with the object of ensuring that the two layers are joined together.

The term "polymer" refers to a large molecule, or macromolecule, composed of many repeated subunits.

The term "polyolefin" refers to any of a class of polymers produced from a simple olefin as a monomer.

The term "PP" refers to polypropylene.

The term "PE" refers to polyethylene.

As illustrated in FIGS. 1 to 4, the invention relates to a laminated material 1 for forming a flexible container 100. The laminated material 1 comprises one or several polymeric layers 10 and at least two paper layers 30.

For the same amount of paper in mass in the laminated material, multiplying the number of paper layers involves a diminution of the thickness of said paper layers. The applicant discovered that reducing the thickness of the paper layers allows to reduce the delamination of laminated material 1.

Indeed, when forming the laminated material and when forming a tube skirt from said laminated material, the paper layers of laminated material may undergo mechanical stress which can lead to delamination issues. When a layer of paper of a given thickness is replaced by a plurality of paper layers of lower thickness, the mechanical stress originally undergone by the single paper layer is distributed over the different paper layers of reduced thickness and reduced in each layer under a given threshold under which delamination issues can be more easily avoided.

As exposed above, the paper layers may promote delamination. In case of a laminate material used to form a tube skirt, this delamination is especially promoted in the region of the junction between a tube head and the skirt as the laminated material forming the tube skirt is folded on its inner side. The invention allows reducing the delamination issues, especially during the manufacturing of the tube skirt.

In the context of the invention, the addition of a new layer of paper does not consist in adding paper material in the laminated material but rather in better distributing a given quantity of paper.

The polymeric layers 10 can comprise any polymer suitable for their use in the field of cosmetic packaging such as PE and PP. Advantageously, the polymeric layers all comprise PE. More advantageously, the polymeric layers are made of PE, especially LDPE (low density polyethylene).

Advantageously, the laminated material 1 comprises at least one barrier layer 20. The barrier layer 20 can comprise any material suitable for the their use in the field of cosmetic packaging. Advantageously, the barrier layer 20 comprise aluminum. More advantageously, the barrier layer 20 comprise EVOH.

Advantageously, the laminated material 1 may comprises adhesive layers 40 or tie layers, especially to establish contact between the barrier layer 20 and a neighboring layer. The adhesive layer 40 can comprise any adhesive suitable for this use, such as EAA (Ethylene Acrylic Acid).

Advantageously, the paper layers represent at least 60% in mass of the laminated material. More advantageously, the paper layer represents at least 70% in mass of the laminated material. Such a ratio of paper in the laminated material 1 allows a good recyclability of said laminated material.

Preferably, each paper layer 30 has a thickness comprised between 100 and 200 μm. A paper layer 30 having a thickness of less than 100 μm will be sensitive and its manipulation during the manufacturing of the laminated material 1 will be complex. A paper layer 30 having a thickness of more than 200 μm will be easily and safely handled during the manufacturing of the laminated material 1 but will involve delamination issues, especially when folded. Thus, a paper layer 30 having a thickness comprised between 100 and 200 μm allows safe manipulation and decreases the delamination issues.

The total thickness of the paper layers depends on the thickness of each paper layer 30 and on the number of paper layers 30. Advantageously, the total thickness of the paper layers 30 is comprised between 200 μm and 400 μm.

Preferably, the total thickness of the laminated material is comprised between 300 and 450 μm. This range of thickness allows good mechanical properties for a laminated material 1 comprising around 70% of paper in mass.

Advantageously, the total thickness of the paper layers 30 represent more than 50% of the total thickness of the laminated material 1. More advantageously, the total thickness of the paper layers 30 represent more than 70% of the total thickness of the laminated material 1. Such a ratio of paper in the laminated material 1 allows a good recyclability of said laminated material 1 while keeping good mechanical properties.

Preferably, as represented in the FIGS. 1 to 4, the laminated material 1 comprises an inner paper layer 31 and an outer paper layer 32. The term "inner" paper layer does not mean that there can't be any layers under said inner paper layer 31. The inner paper layer 31 is the first layer of paper starting from the inner surface of the laminated material 1.

In the same way, The term "outer" paper layer does not mean that there can't be any layers above said outer paper layer 32. The outer paper layer 32 is the first layer of paper starting from the upper surface of the laminated material 1.

Advantageously, according to the embodiments represented at the FIGS. 1 to 3, the paper layers 30 have different thickness. More advantageously, the outer paper layer 32 is thicker than the inner paper layer 31.

When forming a tube 200, a tube skirt 100, made from the laminated material 1, is fixed to a tube head 150 as represented in FIG. 6. The tube skirt 100 is folded on its inner side in the region 140 of the junction between the tube head 150 and the skirt 100. When said tube skirt 100 is folded, the innermost layers of the laminated material 1 are more subject to mechanical stress than the outermost layers. As exposed above, a thicker paper layer is more subject to mechanical stress than a thinner paper layer, especially when folded. Thus, in a configuration in which the inner paper layer 31 is thinner than the outer paper layer 32, the delamination issues are reduced.

A paper layer having a higher grammage will be more subject to mechanical stress. Advantageously, the grammage of the inner paper layer 31 is inferior to the grammage of the outer paper layer 32. This configuration helps to reduce the delamination issues.

These delamination issues can be further reduced by controlling other features such as the contact surface between paper and polymer.

Advantageously, according to the embodiment represented at the FIG. 4, the laminated material 1 comprises an intermediate paper layer 33. Said intermediate paper layer 33 is located between the inner paper layer 31 and the outer paper layer 32. This doesn't mean that the intermediate paper layer 33 is in direct contact with the other paper layers 30.

Alternatively, according to this embodiment, the paper layers 30 have the same thickness. Still according to this embodiment, the paper layers 30 advantageously have the same grammage.

Preferably, the paper layers 30 are separated by at least one polymeric layer 10. The presence of a polymeric layer 10 between paper layers 30 allows to avoid paper/paper contact which could lead to delamination issues.

Advantageously, at least one paper layer 30 is sandwiched by polymeric layers 10. The paper layer 30 being sandwiched by polymeric layers 10, the contact surface between the paper and the polymer is increased.

More advantageously, all the paper layers 30 are sandwiched by polymeric layers 10. In the same way, this configuration further increases the contact surface between the paper and the polymer. This configuration can be seen at the FIGS. 2 to 4.

The applicant discovered that, when the contact surface between the paper and the polymer is increased, the cohesion of the laminated material 1 is improved. This reduces the delamination issues.

In a preferred embodiment, the laminated material 1 comprises at least two polymeric layers 10 and at least two paper layers 30, said paper layers representing at least 70% in mass of the laminated layer, the thickness of each paper layer being comprised between 100 and 200 μm.

In the context of the invention, if a thicker laminated material is wanted for a specific use, the thickness increasing is not realized by using thicker paper layers but rather by adding a new paper layer of substantially the same thickness, which is advantageously comprised between 100 and 200 μm.

The following structures are exemplary embodiments of laminated materials according to the present invention. The invention is not restricted to the specific laminated material of the exemplary embodiments but encompasses other laminated material structures falling within the scope of the appended claims.

The different layers of these exemplary embodiments of laminated material are described starting from the external layer, i.e. the intended outer surface uppermost, to the internal layer, i.e. the intended inner (product-contacting) surface lowermost. Examples 1 to 4 respectively correspond to FIGS. 1 to 4.

EXAMPLE 1

| Substrate | Grammage (g/m$^2$) | Thickness (μm) |
| --- | --- | --- |
| Paper | 130 | 185 |
| LDPE | 11.8 | 13 |
| Paper | 100 | 140 |
| LDPE | 28 | 30.5 |
| EAA | | |
| Aluminum | 16.2 | 6 |
| EAA | 37 | 40.5 |
| LDPE | | |

The total thickness of the laminated material according to this embodiment is 415 μm.

EXAMPLE 2

| Substrate | Grammage (g/m$^2$) | Thickness (μm) |
| --- | --- | --- |
| LDPE | 27 | 30 |
| Paper | 130 | 185 |
| LDPE | 11.8 | 13 |
| Paper | 100 | 140 |
| LDPE | 28 | 30.5 |
| EAA | | |
| Aluminum | 16.2 | 6 |
| EAA | 37 | 40.5 |
| LDPE | | |

The total thickness of the laminated material according to this embodiment is 445 μm.

EXAMPLE 3

| Substrate | Grammage (g/m$^2$) | Thickness (μm) |
| --- | --- | --- |
| LDPE | 27 | 30 |
| Paper | 130 | 185 |
| LDPE | 12 | 13 |
| Paper | 100 | 140 |
| LDPE | 14 | 15.5 |
| EVOH | 77.6 | 80 |

The total thickness of the laminated material according to this embodiment is 463.5 μm.

EXAMPLE 4

| Substrate | Grammage (g/m$^2$) | Thickness (μm) |
| --- | --- | --- |
| LDPE | 27 | 30 |
| Paper | 130 | 180 |
| LDPE | 14 | 15 |
| Paper | 130 | 180 |
| LDPE | 14 | 15 |
| Paper | 130 | 180 |
| LDPE | 14 | 15 |
| EVOH | 68 | 70 |

The total thickness of the laminated material according to this embodiment is 685 μm.

As represented at FIGS. 5 and 6, the invention also relates to a tube skirt 100 made of the laminated material 1 as described above. The tube skirt 100 comprises an overlapping region 110 forming an overlap side seam 120.

When forming a tube skirt, a sheet of laminated material is cylindrically rolled. Opposite edges of said sheet are overlapped in order to form an overlapping region 110. Said overlapping region 110 is then compressed and heated in order to form an overlap side seam 120. As represented at FIG. 5, the tube skirt 100 comprises an interior side which in intended to come in contact with the product contained by the container and an exterior side.

However, when using a laminated material 1 comprising a paper layer 30, it is not possible to compress and heat as much as with plastic laminate since the paper has a lower compression ratio than usual plastic layers. The compression needed to form the overlap side seam 120 might damages the paper.

The thicker the paper layer, the more sensitive the paper will be to compression. When a paper layer is compressed, the paper structure can be altered and degraded. For a same level of compression, this alteration is more important with thicker paper layer. Therefore, by multiplying the number of paper layers and thus by reducing the thickness of said paper layers, the resistance to compression of the laminated material is improved and the paper will be less altered.

However, in case of a high percentage of paper in the laminated material, the maximal allowable compression might not be enough to securely seal the skirt. It thus might be necessary to secure the sealing of the skirt. Furthermore, due to this low compression, the tube skirt 100 might comprises, in the overlapping region, a discontinuity 105 in the shape of a step at least in the inner side of the skirt, which makes joining the tube head to said tube skirt problematic. During this assembly step, said discontinuity 105 generates defects in the manufactured packaging, such as leaks or visible defects, making it unsuitable for sale.

Advantageously, the tube skirt 100 comprises at least a sealing strip 130 at the level of the overlapping region 110. This sealing strip 130 secures the sealing of the tube skirt 100, removes the discontinuity 105 in the internal surface at the side seam 120 and makes it easier to join the tube head 150 to said tube skirt 100.

The sealing strip 130 represents a small percentage in mass of the tube skirt 100. The sealing strip is either a monolayer or a multilayer strip.

Said sealing strip 130 also protects the edges of the laminated material sheet in the overlapping region. This aspect is especially relevant for the paper layers 30 as their edges are particularly sensible.

Preferably, as represented at FIGS. 5 and 6, the tube skirt 100 comprises a first sealing strip 131 covering the overlap side seam 120 at the interior side of the tube skirt 100 and a second sealing strip 132 covering the overlap side seam 120 at the exterior side of the tube skirt 100. The second sealing strip 132 allows further securing the sealing of the skirt 100.

FIG. 5 represents the sealing strips 31 and 32 before the welding of the tube skirt 100 and the formation of the side seam 120. FIG. 6 represents said sealing strips 31 and 32 after the welding of the tube skirt 100. It can be seen that the sealing strips melts at least partially during the welding. The discontinuity 105 are filled by material from the sealing strip.

Advantageously, the overlap side seam 120 has a width (w) of at most 0.5 mm. As the sealing is already secured by at least one sealing strip 130, it is not necessary to form a large overlapping region 110. Reducing the width (w) of the overlapping region allows to save material. At an industrial scale, this small amount of saved material is particularly relevant.

More advantageously, the sealing strip 130 have a width comprised between 3 and 5 mm. This allows to cover the entire overlapping region 110 and the discontinuity 105. The sealing of the tube skirt 100 is thus improved.

Preferably, the sealing strips 130 comprise PE and EVOH. The PE is a sealable material allowing a good sealing of the skirt 100 and a good sealing with the tube head 150. The EVOH has good barrier properties and thus ensure the barrier effect at the level of the side seam 120.

This aspect of the invention is not limited to the laminated material described above with several layers of paper. Indeed, such overlapping region can be used with laminated material for forming a flexible container having one or several paper layers.

According to this aspect, the invention concerns a tube skirt formed by a rolled up sheet of laminated material comprising two opposite edges, said tube skirt comprising an interior side, an exterior side and a longitudinal overlap side seam overlapping the edges of the sheet, said tube skirt comprising a first sealing strip covering the overlap side seam at the interior side of the tube skirt and a second sealing strip covering the overlap side seam at the exterior side of the tube skirt The tube skirt according to this aspect of the invention can also comprise any of the following features taken individually or in any technically possible combination:
- the laminated material forming the tube skirt comprises at least one paper layer,
- the paper represent at least 60% in mass of the tube skirt,
- the sealing strips are made of a laminated material,
- the sealing strips comprise PE and EVOH,
- the overlap side seam has a width of at most 0.5 mm,
- the sealing strip has a width comprised between 3 and 5 mm,
- the overlap side seam is not compressed,
- the laminated material comprises an upper face and a lower face, the upper face of the sheet being directly sealed to the lower face of the sheet in order to form the longitudinal overlap side seam.

As represented at FIGS. 6 and 7, the invention also relates to a tube 200 comprising the tube skirt 100 as described above and a tube head 150, in which the paper represents at least 50% in mass of the tube 200.

The invention claimed is:

1. A tube comprising:
a tube head; and
a tube skirt made of a laminated material comprising one or several polymeric layers and at least two paper layers, said tube skirt comprising an overlapping region forming an overlap side seam and at least a sealing strip at a level of the overlapping region, the paper layers representing at least 50% in mass of the tube.

2. The tube according to claim 1, wherein the paper layers represent at least 70% in mass of the laminated material.

3. The tube according to claim 1, wherein each paper layer has a thickness comprised between 100 and 200 pm.

4. The tube according to claim 1, wherein a total thickness of the paper layers represents more than 50% of the total thickness of the laminated material.

5. The tube according to claim 1, wherein at least one of the paper layers is sandwiched by said or some of said polymeric layers.

6. The tube according to claim 1, wherein said tube skirt comprises a first sealing strip covering the overlap side seam at an interior side of the tube skirt and a second sealing strip covering the overlap side seam at an exterior side of the tube skirt.

7. The tube according to claim 1, wherein the overlap side seam as a width (w) of at most 0.5mm.

8. The tube according to claim 1, wherein the sealing strip has a width comprised between 3 and 5mm.

9. The tube according to claim 1, wherein the sealing strip comprises PE and EVOH.

10. The tube according to claim 1, wherein the paper layers are separated by at least one of said polymeric layer.

11. The tube according to claim 10, wherein a proportion in mass of said layer is chosen so that said laminated material is recyclable.

12. The tube according to claim 1, wherein the laminated material comprises an inner paper layer and an outer paper layer, the outer paper layer being thicker than the inner paper layer.

13. The tube according to claim 12, wherein a grammage of the inner paper layer is inferior to a grammage of the outer paper layer.

* * * * *